United States Patent
Fulghum et al.

(10) Patent No.: US 7,590,167 B2
(45) Date of Patent: Sep. 15, 2009

(54) METHOD AND APPARATUS FOR QAM DEMODULATION IN A GENERALIZED RAKE RECEIVER

(75) Inventors: Tracy L. Fulghum, Durham, NC (US); Douglas A. Cairns, Durham, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 606 days.

(21) Appl. No.: 11/215,584

(22) Filed: Aug. 30, 2005

(65) Prior Publication Data

US 2007/0047628 A1 Mar. 1, 2007

(51) Int. Cl.
H04B 1/00 (2006.01)

(52) U.S. Cl. ...................................................... 375/148

(58) Field of Classification Search .................. 375/130, 375/144, 147–148, 340, 346–350
See application file for complete search history.

(56) References Cited

U.S. PATENT DOCUMENTS

| | | | |
|---|---|---|---|
| 6,108,375 | A | 8/2000 | Farrokh et al. |
| 6,430,214 | B1 | 8/2002 | Jalloul et al. |
| 6,603,823 | B1 * | 8/2003 | Yellin et al. ................. 375/340 |
| 6,671,268 | B2 | 12/2003 | Leung |
| 6,931,050 | B1 * | 8/2005 | Bottomley ................. 375/130 |
| 7,236,514 | B2 * | 6/2007 | Bottomley et al. .......... 375/147 |
| 2002/0141505 | A1 | 10/2002 | Lundby |
| 2003/0031278 | A1 | 2/2003 | Kang et al. |
| 2003/0092447 | A1 | 5/2003 | Bottomley et al. |
| 2003/0133520 | A1 | 7/2003 | Jayaraman et al. |
| 2003/0156563 | A1 | 8/2003 | Papasakellariou et al. |
| 2004/0048619 | A1 | 3/2004 | Kim et al. |
| 2004/0066773 | A1 | 4/2004 | Sun et al. |
| 2004/0264591 | A1 | 12/2004 | Malm et al. |
| 2005/0002478 | A1 | 1/2005 | Agami et al. |
| 2005/0069023 | A1 | 3/2005 | Bottomley et al. |
| 2005/0111528 | A1 | 5/2005 | Fulghum et al. |
| 2005/0163199 | A1 | 7/2005 | Wang |

(Continued)

FOREIGN PATENT DOCUMENTS

EP 0 639 915 A1 2/1995

(Continued)

OTHER PUBLICATIONS

Co-pending U.S. Appl. No. 11/935,840, filed Nov. 7, 2007.

(Continued)

*Primary Examiner*—Khanh C Tran
(74) *Attorney, Agent, or Firm*—Coats & Bennett, P.L.L.C.

(57) ABSTRACT

A wireless communication device includes a Generalized RAKE (G-RAKE) receiver circuit that is configured to determine a traffic-to-pilot gain scaling parameter as part of the impairment correlation determination process that underlies (G-RAKE) combining weight generation. In this manner, the receiver circuit conveniently and accurately accounts for gain differences between the pilot channel of a received CDMA signal, as used for channel estimation, and the traffic channel(s) of the CDMA signal, which carry received data to be recovered. The gain difference accounting enables proper demodulation of amplitude-modulated traffic signals. By way of non-limiting example, such gain scaling may be used for demodulating/decoding High Speed Downlink Packet Access (HSDPA) signals used in Wideband Code Division Multiple Access (W-CDMA) systems.

24 Claims, 4 Drawing Sheets

U.S. PATENT DOCUMENTS

2005/0201447 A1    9/2005    Cairns et al.

FOREIGN PATENT DOCUMENTS

EP    1 191 713 A1    3/2002
EP    1 422 896 A1    5/2004

OTHER PUBLICATIONS

Cairns D A et al., "Low Complexity Parameter Estimation for the Generalized Rake Receiver," Aug. 1, 2004, pp. 191-195, XP010806726.

Zhu, Jie and Lee, Wookwon, "Channel Estimation with Power-Controlled Pilot Symbols and Decision-Directed Reference Symbols"; 2003; 5 pages; Fayetteville, Arkansas, USA.

Lee, Jungwoo, "Log Likelihood Ratio Calculation Without SNR Estimation for Forward Line DS-CDMA Receivers"; IEE Signal Processing Letters; Jun. 2004; 4 pages; vol. 11 No. 6.

Wong, Kainam Thomas et. al. A "Self-Decorrelating" Technique to Enhance Blind Space-Time RAKE Receivers with Single-User-Type DS-CDMA Detector; 2001; 5 pages.

Schramm, Peter, "Analysis and Optimization of Pilot-Channel-Assisted BPSK for DS-CDMA Systems"; IEE Transactions on Communications; Sep. 1998; 3 pages; vol. 46, No. 9.

Shin, Simon et. al., "CDMA200 1X Performance Comparison with Pilot Power Ratio"; 2002 International Zurich Seminar on Broadband Communications; Feb. 19-21, 2002; 6 pages.

Sung, Younchul et. al., "Blind Channel Tracking For Long-Code WCDMA With Linear Interpolation Model"; 2002; 5 pages.

Zesong, Fei et. al., "Improved Binary Turbo Coded Modulation with 16QAM in HSDPA"; 2003; 4 pages.

Zheng, Kan et. al., "Analysis and Optimization of Pilot-Symbol-Assisted MC-CDMA Systems"; WCNC-IEE Communications Society; 2004; 5 pages.

Signaling of CPICH and DSCH power ratio for M-ary demodulation, AH24: High Speed Downlink Packet Transmission; TSG-RAN Working Group Meeting #16; Pusan, Korea, Sep. 10-13, 2000; 2 pages.

UE complexity for AMCS; AH24: High Speed Downlink Packet Transmission; TSG-RAN Working Group Meeting #18, Boston, MA; Jan. 15-18, 2001; 6 pages.

Choi, BJ et. al., "Rake Receiver Detection of Adaptive Modulation Aided CDMA over Frequency Selective Channels"; In Proceedings of VTC 2001 (Fall), Atlantic City; 5 pages.

Parkvall, et. al., Evolving WCDMA for Improved High Speed Mobile Internet; Proc. Future Telecommunications Conference 2001, Beijing, China, Nov. 28-30, 2001; 5 pages.

Wang et. al., "Generalized RAKE Reception for Canceling Interference from Multiple Base Stations"; Proc. IEE Vehicular Technology Conference, Boston; Sep. 24-28, 2000; 7 pages.

Bottomley, G. et. al., "A Generalized RAKE Receiver for Interference Suppression"; IEE Journal on Selected Areas in Communications, vol. 18, No. 8, Aug. 2000; 10 pages.

A Method for Blind Determination of Pilot to Data Power Ration for QAM Signals', TSG-RAN Working Group 1, Meeting # 21, Aug. 2001.

* cited by examiner

METHOD AND APPARATUS FOR QAM DEMODULATION IN A GENERALIZED RAKE RECEIVER

BACKGROUND OF THE INVENTION

The present invention relates to wireless communication receivers, and particularly relates to demodulating amplitude-modulated signals.

Higher-order modulation constellations represent one mechanism supporting the faster data rates of current and evolving wireless communication systems. For a given symbol rate, more bits in each modulation symbol translate into higher effective data rates, assuming acceptable demodulation performance at the receiver. In general, the use of more complex modulation constellations for data transmission results in greater demodulation challenges at the receivers.

In part, such challenges arise because higher order modulation schemes commonly use amplitude changes to convey information. For example, Quadrature Amplitude Modulation (QAM) generally defines modulation constellation points arrayed around the origin in the real-imaginary plane, where each point represents a unique pairing of phase and amplitude. 16 QAM, for example, defines four points in each quadrant, yielding sixteen points in the QAM constellation. Each such point represents one of sixteen modulation symbols and is recognizable at the receiver based on the unique pairing of phase and amplitude represented by the symbol. With sixteen unique symbols, each QAM modulation symbol represents four bits, and thus affords higher effective data rates than QPSK, for example, assuming the same modulation symbol rate.

Sometimes different modulation formats are used at different times, with the choice often made as a function of available transmitter resources, prevailing radio conditions, and/or required data rates. For example, the High Speed Downlink Packet Access (HSDPA) extension of the Wideband CDMA (W-CDMA) standard offers a range of data rates on a High Speed Downlink Shared Channel (HS-DSCH), which is a shared packet data channel using either QPSK or QAM modulation, depending on data rate requirements.

Use of 16QAM on the HS-DSCH enables higher data rates, but such use complicates data reception. Specifically, an amplitude reference is required at the receiver to detect received symbols and properly scale the soft information for decoding (e.g., by a turbo decoder). For HS-DSCH, and for CDMA-based pilot-and-traffic-channel transmissions in general, the needed amplitude reference represents the relative scaling between the code channel used for estimation (e.g., the pilot or reference channel) and the code channel(s) being demodulated (e.g., the traffic or information-bearing channels). The needed scale factor g can be written as $$h_{traf} = g h_{pil} \quad \text{Eq. 1}$$

where $h_{pil}$ is a channel response vector, as defined in G. E. Bottomley, T. Ottosson, and Y.-P. E. Wang, "A Generalized RAKE receiver for interference suppression," IEEE J. Select. Areas Commun., vol. 18, pp. 1536-1545, August 2000, for example, which can be estimated from the pilot channel, $h_{traf}$ represents the channel response vector for the traffic channel, and g is the scale factor. To illustrate the usefulness of the scale factor, consider the Log-Likelihood Ratio (LLR) for bit $b_j$ of the ideal QAM demodulator, which is given as $$LLR(b_j) = \frac{\sum_{s_i \in S_0(j)} \exp\left\{\gamma\left(2\text{Re}\left(\frac{s_i^* z}{w^H h_{traf}}\right) - |s_i|^2\right)\right\}}{\sum_{s_i \in S_1(j)} \exp\left\{\gamma\left(2\text{Re}\left(\frac{s_i^* z}{w^H h_{traf}}\right) - |s_i|^2\right)\right\}} \quad \text{Eq. 2}$$

In the above equation, z is the estimated symbol, $s_i$ is a candidate symbol from a normalized scale constellation, $\gamma$ is the signal-to-noise ratio (SNR), which actually may be calculated as a signal-to-interference-plus-noise ratio (SINR), and w represents a vector of combining weights. Assuming a log-max turbo decoder, the log-likelihood ratio becomes $$LLR(b_j) = \gamma\left[\max_{s_i \in S_0(j)}\left(2\text{Re}\left(\frac{s_i^* z}{\mu}\right) - |s_i|^2\right) - \max_{s_i \in S_1(j)}\left(2\text{Re}\left(\frac{s_i^* z}{\mu}\right) - |s_i|^2\right)\right]. \quad \text{Eq. 3}$$

The normalization factor $\mu$ in Eq. 3 is defined as $$\mu = w^H h_{traf}. \quad \text{Eq. 4}$$

Here, the normalization factor scales the symbol estimate z for comparison to the symbols $s_i$ from a unitary average power constellation. Conventionally, receivers determine the scale factor through time estimation of the RMS value of the symbol estimate, which may be expressed as, $$\sqrt{\langle |z|^2 \rangle} \approx w^H h_{traf} = \mu. \quad \text{Eq. 5}$$

From the above equations, one sees that the normalization factor provides a basis for properly evaluating the log-likelihood ratio used in decoding the estimated traffic symbol z. It may be observed that Eq. 4 can be rewritten in consideration of Eq. 1 as $$\mu = g w^H h_{pil}. \quad \text{Eq. 6}$$

Thus, as an alternative to calculating a normalization value from Eq. 5, received signal processing may be configured to the normalization factor given in Eq. 6. However, that calculation may be challenging in terms of implementing it efficiently and/or integrating the calculation into existing received signal processing calculations.

SUMMARY OF THE INVENTION

A Generalized RAKE (G-RAKE) receiver circuit suitable for use in a wireless communication device is configured to determine a traffic-to-pilot gain scaling parameter in a G-RAKE receiver as part of the impairment correlation determination process that underlies combining weight generation. In this manner, the receiver circuit conveniently and accurately accounts for gain differences between the pilot channel of a received CDMA signal, as used for channel estimation, and the traffic channel(s) of the received CDMA signal, which carry received data to be recovered. The gain difference accounting enables proper demodulation of amplitude-modulated signals, such as the 16 QAM signals associated with High Speed Downlink Shared Channel (HS-DSCH) transmissions in Wideband Code Division Multiple Access (W-CDMA) systems.

In one embodiment, the G-RAKE receiver circuit comprises one or more processing circuits configured to determine a traffic-to-pilot gain scaling parameter. More particularly the one or more processing circuits are configured to express data correlations of despread traffic values (i.e. information-bearing symbols) obtained from a received CDMA signal as a function of interference and noise correlations scaled by first and second model fitting parameters, respectively, and channel estimates scaled by a gain scaling parameter.

With this expression, the processing circuit(s) determines the gain scaling parameter in conjunction with determining the first and second model fitting parameters via least squares fitting of the function to the data correlations. Further, in one or more embodiments, the gain scaling parameter provides the basis for calculating a normalization factor used in demodulating the traffic symbol estimates output by the G-RAKE receiver circuit, e.g., the normalization factor can be used to scale the estimated symbols for comparison to nominal symbols in a reference constellation.

In a non-limiting example, receiver processing as taught herein may be embodied as a computer program, suitable for execution on general-purpose or specialized microprocessor circuits. In one embodiment, the computer program comprises program instructions to obtain despread traffic and pilot values from a received CDMA signal, generate channel estimates from the despread pilot values, and measure data correlations for the despread traffic values. The program further comprises program instructions to express the data correlations as a function of interference and noise correlations scaled by first and second model fitting parameters and the channel estimates scaled by a gain scaling parameter, and to determine the gain scaling parameter in conjunction with the first and second model fitting parameters via least squares fitting of the function to the data correlations. Embodiments of the present invention thus include a computer readable medium storing a computer program as described above.

Of course, the present invention is not limited to the above features and advantages. Those skilled in the art will appreciate additional features and advantages of the present invention upon reading the following discussion, and upon viewing the accompanying drawings.

DETAILED DESCRIPTION OF THE INVENTION

Figure 1:
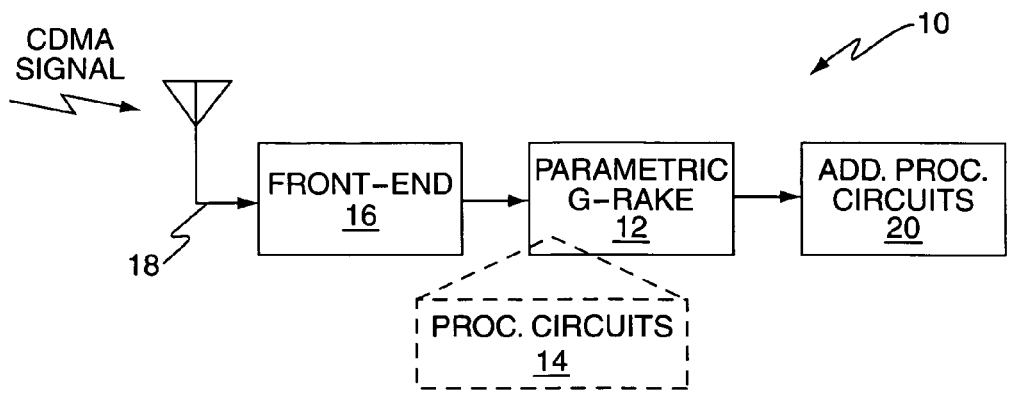
FIG. 1 is a block diagram of a wireless communication receiver, including a Generalized RAKE (G-RAKE) receiver circuit that is configured to determine traffic-to-pilot gain scaling for demodulation and decoding.

FIG. 1 illustrates a wireless communication receiver 10. In the illustrated embodiment, the receiver 10 comprises a Generalized RAKE (G-RAKE) receiver circuit 12, which includes one or more processing circuits 14 that are config- ured for traffic-to-pilot gain scaling as taught herein, a receiver front-end circuit 16, an antenna 18, and one or more additional processing circuits 20, such as demodulator circuits and/or turbo decoding circuits.

The receiver 10 may, depending upon its operating mode and/or depending upon the characteristics of its supporting wireless communication network, receive a CDMA signal having amplitude information carried within it. For example, the received CDMA signal may comprise a Wideband CDMA (W-CDMA) signal, including a multi-coded High Speed Downlink Shared Channel (HS-DSCH) signal transmitted using Quadrature Amplitude Modulation (QAM). Such systems "map" groups of information bits to be transmitted to points in a modulation constellation, wherein, for 16 QAM, each point represents one of sixteen unique pairings of phase and amplitude. These phase/amplitude pairings are referred to as modulation symbols.

With sixteen symbols (points) in the 16 QAM constellation, each symbol represents a unique combination of four transmit bits, and recovery of those bits at the receiver depends on accurately identifying the received modulation symbols. In turn, accurate recovery of the received modulation symbols, i.e., the traffic symbols, depends on accurate channel estimation. As a general rule, CDMA receivers estimate the transmission channel(s) based on a received pilot signal, which commonly is sent in conjunction with the traffic channel(s) of interest, but using different spreading factors and transmit powers. As such, there is a definite, but usually unknown, amplitude relationship between the traffic signal(s) of interest and the pilot signal used for channel estimation.

The G-RAKE receiver circuit 12, which may be implemented in a variety of devices and systems, provides for the traffic-to-pilot gain scaling needed to properly demodulate 16 QAM and other amplitude-modulated signals. The G-RAKE receiver circuit 12 may operate as a parametric G-RAKE. As used herein, the term "parametric G-RAKE" connotes a G-RAKE receiver that uses modeled terms for the interference and/or noise correlations that are used in its combining weight generation. As those skilled in the art will appreciate, a "standard" RAKE receiver combines multipath images of a received signal using propagation channel taps as combining weights, whereas a G-RAKE receiver combines multipath images of a received signal using interference-suppressing combining weights calculated from the interference and/or noise correlations measured or estimated across the RAKE fingers. For additional G-RAKE details, one may refer to U.S. Pat. No. 6,363,104 to Bottomley, which is incorporated herein by reference.

In parametric G-RAKE receivers, one or more of the impairment correlations used to generate the combining weights are based on modeled impairments. More particularly, a parametric G-RAKE receiver commonly uses a parametric model to determine the noise correlations used in its combining weight generation.

With the above in mind, according to a broad embodiment of received signal processing as taught herein, the G-RAKE receiver circuit 12 is configured to calculate Eq. 6 through a parametric G-RAKE solution for the combining weights w that are used to generate the symbol estimates z. This approach removes the need for estimating the RMS values given by Eq. 5 for use in symbol detection (i.e., comparing the estimated symbols with nominal symbols in a reference modulation constellation).

Figure 2:
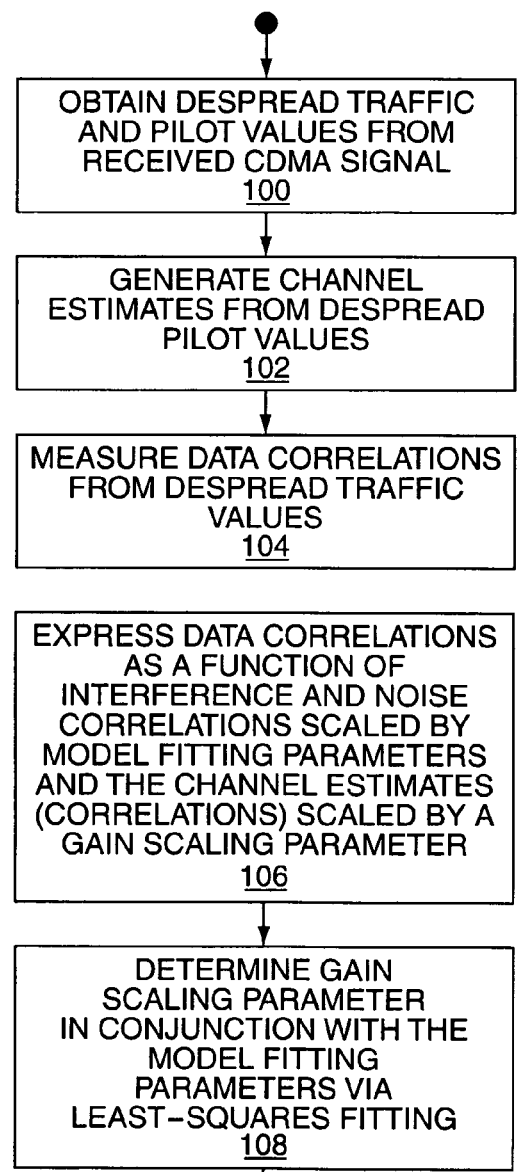
FIG. 2 is a logic flow diagram of general processing logic that can be implemented by the G-RAKE receiver circuit of FIG. 1, for gain scaling determination.

Thus, FIG. 2 illustrates processing logic according to one method of gain scaling as taught herein. According to the illustrated processing, the G-RAKE receiver circuit 12 obtains despread traffic and pilot values from a received CDMA signal (Step 100). The G-RAKE receiver circuit 12 generates channel estimates from the despread pilot values (Step 102). Notably, these channel estimates include the influence of pilot channel spreading factor and pilot channel transmit power.

Processing continues with the G-RAKE receiver circuit 12 measuring data correlations from the despread traffic values (Step 104). The G-RAKE receiver circuit 12 then uses the measured data correlations to determine a traffic-to-pilot gain scaling parameter in conjunction with determining its parametric G-RAKE model fitting parameters (Step 106). While the following discussion explains this step in much more detail, the step generally comprises expressing the measured data correlations as a function of the modeled impairment correlations as scaled by model fitting parameters, and further as a function of the channel estimates scaled by a gain scaling parameter.

With this expression, the G-RAKE receiver circuit 12 uses Least Squares (LS) fitting to determine the model fitting parameters and the gain scaling parameter that best fits the modeled impairment correlations to the measured data correlations (Step 108). That is, as will be detailed below, the G-RAKE receiver circuit 12 expresses the measured (short-term) data correlations as a function of its parametric model, which includes the gain scaling term to be determined, such that LS fitting of the parametric model to the measured data correlations yields the gain scaling term in conjunction with determining the model fitting parameters.

To better understand the above method, it is helpful to begin with the assumption that the channel estimation and (combining) weight computation algorithms implemented by the G-RAKE receiver circuit 12 employ despread data from the pilot channel. With these assumptions in mind, the parametric noise correlation matrix, $R_u$, used by the G-RAKE receiver circuit 12 to compute combining weights may be expressed as $$R_u = \alpha R_I + \beta R_n \quad \text{Eq. 7}$$

The interference matrix ($R_I$) captures the effect of own-cell interference while the white noise matrix ($R_n$) models the effect of other-cell interference plus thermal noise. Note that the weighting coefficients α and β reflect the relative contribution of own-cell versus other-cell interference plus noise. Eq. 7 may be computed explicitly or implicitly. For parametric calculation, the interference correlations $R_I$ and the noise correlations $R_n$ may be modeled terms, and α and β are referred to as first and second model fitting parameters, respectively.

These first and second model fitting parameters are functions of system or environmental factors as shown below $$\alpha = \frac{E_c}{E_{pil}} \quad \text{Eq. 8}$$

$$\beta = N_0 \quad \text{Eq. 9}$$

Here, $E_c$ represents the total energy of the serving base station per chip, $E_{pil}$ is the energy given to the pilot channel, and $N_0$ is the one-sided power spectral density of the white noise that models other-cell interference plus noise.

For an example of model fitting parameter calculation based on short-term estimations of the noise correlations as determined from despread pilot values, one may refer to U.S. application Ser. No. 10/800,167, which was filed on 12 Mar. 2004, is entitled, "Method and Apparatus for Parameter Estimation in a Generalized RAKE Receiver," and which is incorporated herein by reference. In the incorporated reference, determining impairment correlations from the despread pilot values requires an explicit gain scaling calculation as an additional processing step.

In contrast, one or more of the methods taught herein perform parametric model fitting using short-term data correlation estimates determined from despread traffic values, such that the gain scaling parameter needed for proper demodulation of received QAM symbols is determined as part of the model-fitting process.

In more detail, one notes that the noise covariance $R_u$ is identical for all code channels of the received CDMA signal. Thus, the noise covariance matrix can be expressed as $$R_u = R_{traf} - h_{traf} h_{traf}^H \quad \text{Eq. 10}$$

where $R_{traf}$ is the data correlation matrix of the despread values of the traffic channel. Knowing that $h_{traf} = g h_{pil}$, where g is the traffic-to-pilot gain scaling factor to be determined, Eq. 10 can be rewritten as $$R_u = R_{traf} - g^2 h_{pil} h_{pil}^H \quad \text{Eq. 11}$$

With the above expression, one may rewrite Eq. 7 as $$\hat{R}_{traf} = \alpha R_I + \beta R_n + \delta h_{pil} h_{pil}^H \quad \text{Eq. 12}$$

where $\delta = g^2$ (i.e., the square of the desired gain scaling parameter g), $\beta = N_0$ as before, and $$\alpha = \frac{E_c}{E_{CPICH}}.$$

The term "CPICH" denotes the common pilot channel received as part of the composite received CDMA signal. On this basis, the G-RAKE receiver circuit 12 uses a short-term slot estimate of data correlation of despread traffic values, denoted as $\hat{R}_{traf}$, as opposed to determining the short-term correlation estimate from the despread pilot values.

Figure 3:
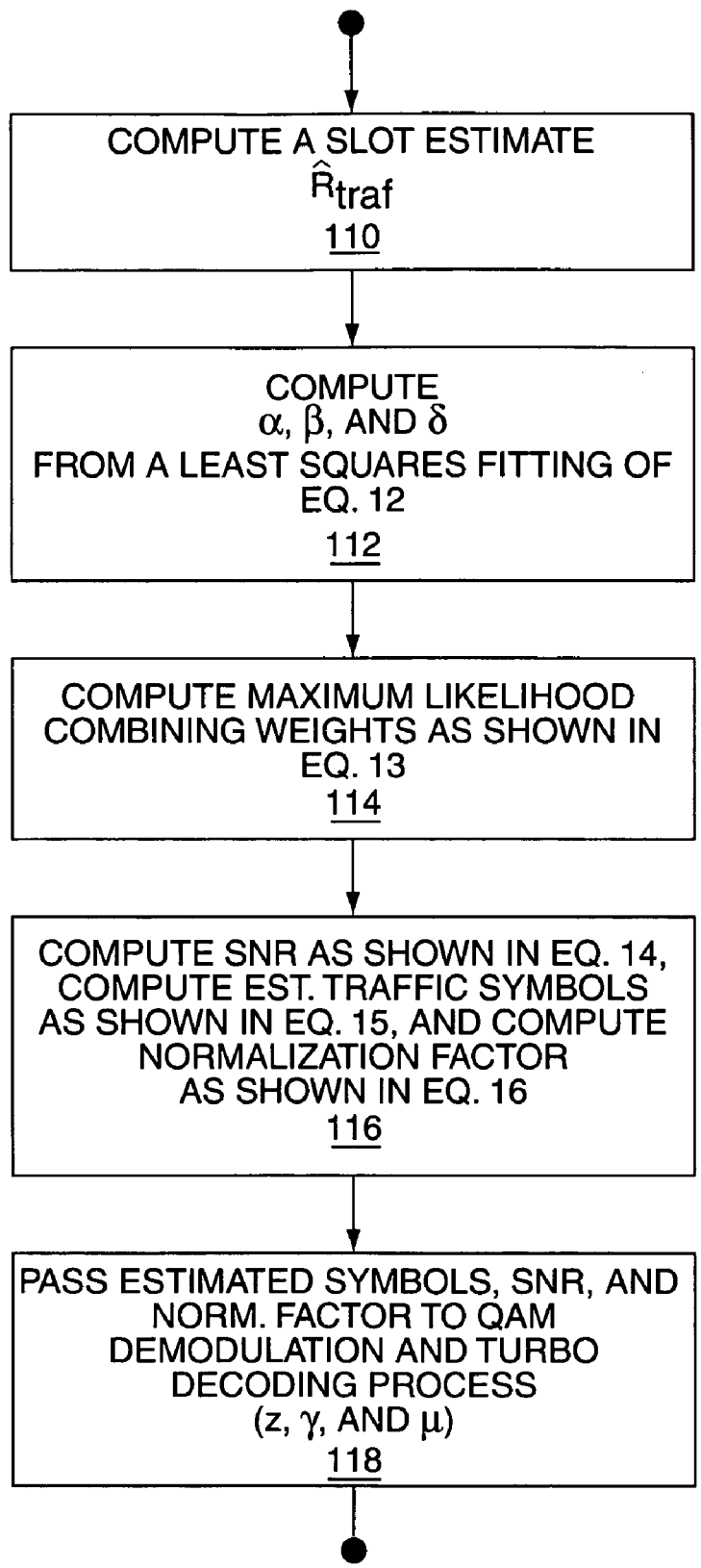
FIG. 3 is a logic flow diagram of a more detailed embodiment of gain scaling processing, such as can be used for a Wideband CDMA (W-CDMA) receiver receiving a High Speed Downlink Shared Channel (HS-DSCH) signal, for example.

FIG. 3 illustrates processing logic according to the above details, wherein processing begins with the G-RAKE receiver circuit 12 computing a short-term estimate of data correlations for the despread traffic values, $\hat{R}_{traf}$, as obtained from the received CDMA signal over a given window of time, e.g., over one slot of a given TTI in a received W-CDMA signal (Step 110). Note that the illustrated start of processing assumes that received signal samples are available—e.g., buffered by the G-RAKE receiver circuit 12—and that channel estimates have been calculated using despread pilot values obtained from the received CDMA signal.

Processing continues with the LS fitting of Eq. 12 (Step 112), which determines values for the first model fitting parameter α, which scales the modeled same-cell interference correlations $R_I$, the second model fitting parameter β, which scales the modeled other-cell plus noise correlations $R_n$, and the gain scaling parameter δ, which scales the $h_{pil} h_{pil}^H$ product of the channel estimates determined from the despread pilot values. With this approach, the G-RAKE receiver circuit 12 is configured to calculate a LS solution of Eq. 12 to obtain the gain scaling parameter $\delta = g^2$ in conjunction with obtaining the model fitting parameters α and β.

The G-RAKE receiver circuit 12 then computes Maximum Likelihood (ML) combining weights (Step 114) as $$w_{pil} = R_u^{-1} h_{pil} \quad \text{Eq. 13}$$

where $R_u$ may be computed according to Eq. 11, for example, using $\hat{R}_{traf}$. With the combining weights thus calculated, the G-RAKE receiver circuit 12 continues its processing by computing the traffic SNR (Step 116) as $$\gamma = \delta w_{pil}^H h_{pil}, \qquad \text{Eq. 14}$$

and estimating the received traffic symbols (Step 116) as, $$z = w_{pil}^H y \qquad \text{Eq. 15}$$

Then, in one or more embodiments, the RAKE receiver circuit 12 is configured to pass the estimated symbols z, SNR γ, and the normalization factor μ to the one or more additional processing circuits 20. In at least one embodiment, these additional processing circuits 20 include a QAM demodulation circuit and a decoding circuit, such as a turbo decoder (Step 118). In practice, the estimated traffic symbols z are normalized to a unitary average power before comparing to a unitary average power QAM constellation template. The term $$\frac{z}{gw^H h_{pil}}$$

represents a normalization for comparing the estimated traffic symbol z to the nominal traffic symbol $s_i$, where $E\{|s_i|^2\} = 1$. (Note that $s_i$ is from the set of nominal symbol values in the unitary-power modulation constellation template.) Remembering that $\delta = g^2$, one may define a normalization factor μ as $$\mu = gw^H h_{pil} = \sqrt{\delta} w^H h_{pil} \qquad \text{Eq. 16}$$

Thus, the normalization factor needed for demodulation of QAM or other amplitude-modulated traffic symbols may be obtained from the gain scaling parameter δ, which is determined as part of the parametric G-RAKE receiver solution, e.g., it is obtained from the LS fitting of Eq. 12.

The instantaneous soft bit information is then obtained by the additional processing circuit(s) 20 based on the distance of the normalized symbol estimate to the points in template constellation. Restoring the channel-dependent soft scaling via the SNR estimate γ provides the final soft bit information, i.e., the instantaneous soft bits are "de-normalized by multiplication with the SNR value.

Figure 4:
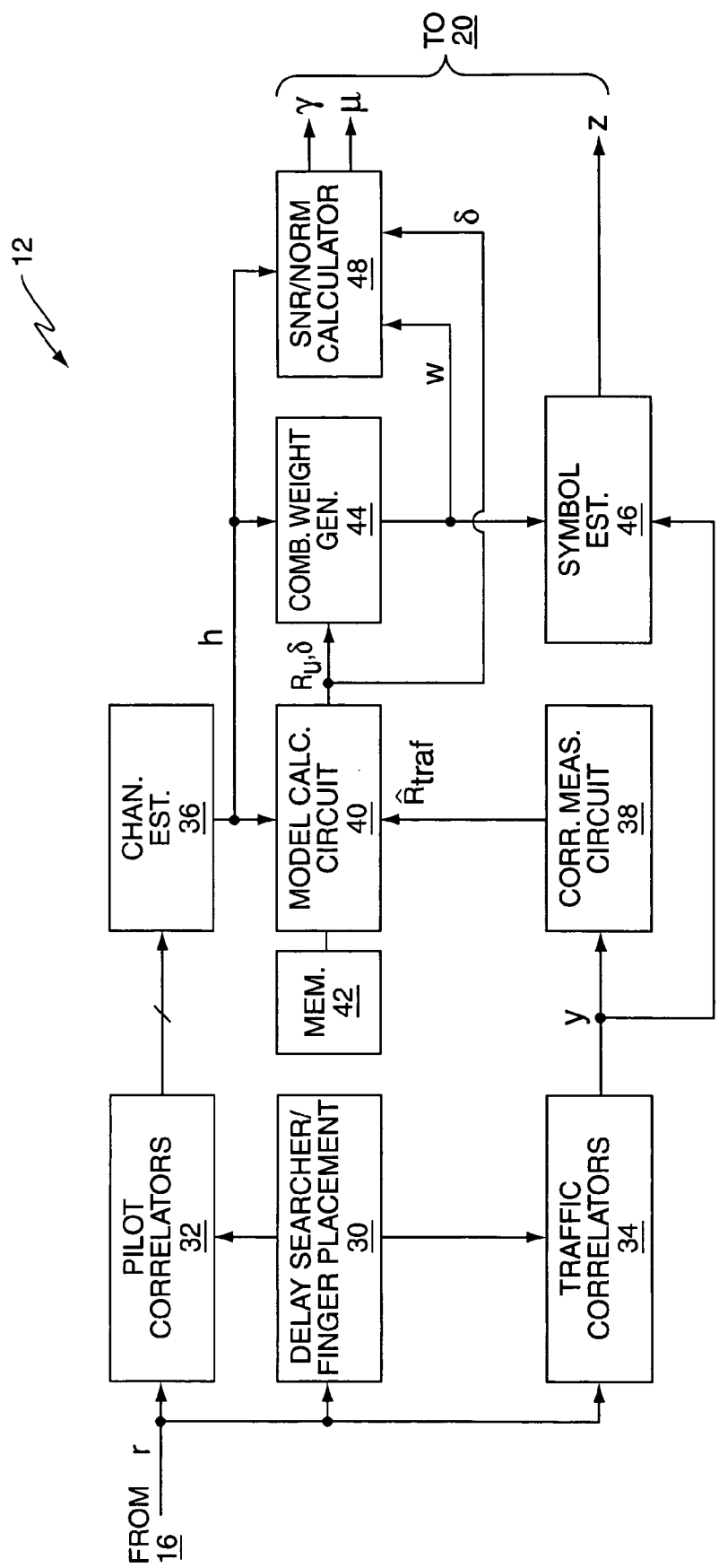
FIG. 4 is a block diagram of circuit details for one embodiment of the G-RAKE receiver circuit of FIG. 1.

Those skilled in the art will appreciate that the G-RAKE receiver circuit 12 may be implemented in a variety of receiver architectures. FIG. 4 illustrates one embodiment, wherein the one or more processing circuits 14 of the G-RAKE receiver circuit 12 include (or are associated with) a delay searcher/finger placement circuit 30, a pilot correlation circuit 32, a traffic correlation circuit 34, a channel estimation circuit 36, a (data) correlation measurement circuit 38, a (parametric) model calculation circuit 40, memory 42, a combining weight calculation circuit 44, a (traffic) symbol estimation circuit 46, and a SNR and normalization factor calculation circuit (SNR/norm calculator) 48.

In operation, the delay searcher/finger placement circuit 30 provides finger placement values for setting the delays used by the pilot and traffic correlation circuits 32 and 34, such that the received CDMA signal is despread at delays corresponding to, or related to, the multipath images of the received CDMA signal. The pilot correlation circuit 32 obtains despread pilot values from the received CDMA signal, which it provides to the channel estimation circuit 36 for calculation of the pilot channel estimates $h_{pil}$. Similarly, the traffic correlation circuit 34 obtains despread traffic values from the received CDMA signal, which it provides to the correlation measurement circuit 38 for measurement of the short-term data correlations $\hat{R}_{traf}$.

In turn, the model calculation circuit 40 uses the channel estimates and the data correlations to carry out the LS fitting for determination of the model fitting parameters α and β, and the gain scaling parameter δ. Note that the parametric modeling and other information used for model fitting may be stored in the memory 42, which may be included in, or associated with the model calculation circuit 40.

Regardless of such details, the combining weight calculation circuit 44 uses the channel estimates $h_{pil}$ and interference correlation matrix $R_u$ to calculate the combining weights $w_{pil}$ for combining the despread traffic values from the different correlator outputs of the traffic correlator circuit 34. Additionally, presuming that the normalization by μ is done as part of QAM demodulation, rather than in the combining step, the symbol estimation circuit 46 uses the combining weights, $w_{pil}$, and the despread traffic values, y, to calculate estimates of the traffic symbols z. The SNR/norm calculator 48 also uses the channel estimates, combining weights, and gain scaling parameter to determine the traffic SNR γ. The values (γ, μ, and z) may be passed from the G-RAKE receiver circuit 12, to the additional processing circuits 20 for using demodulating and decoding the estimated traffic symbols z.

Figure 5:
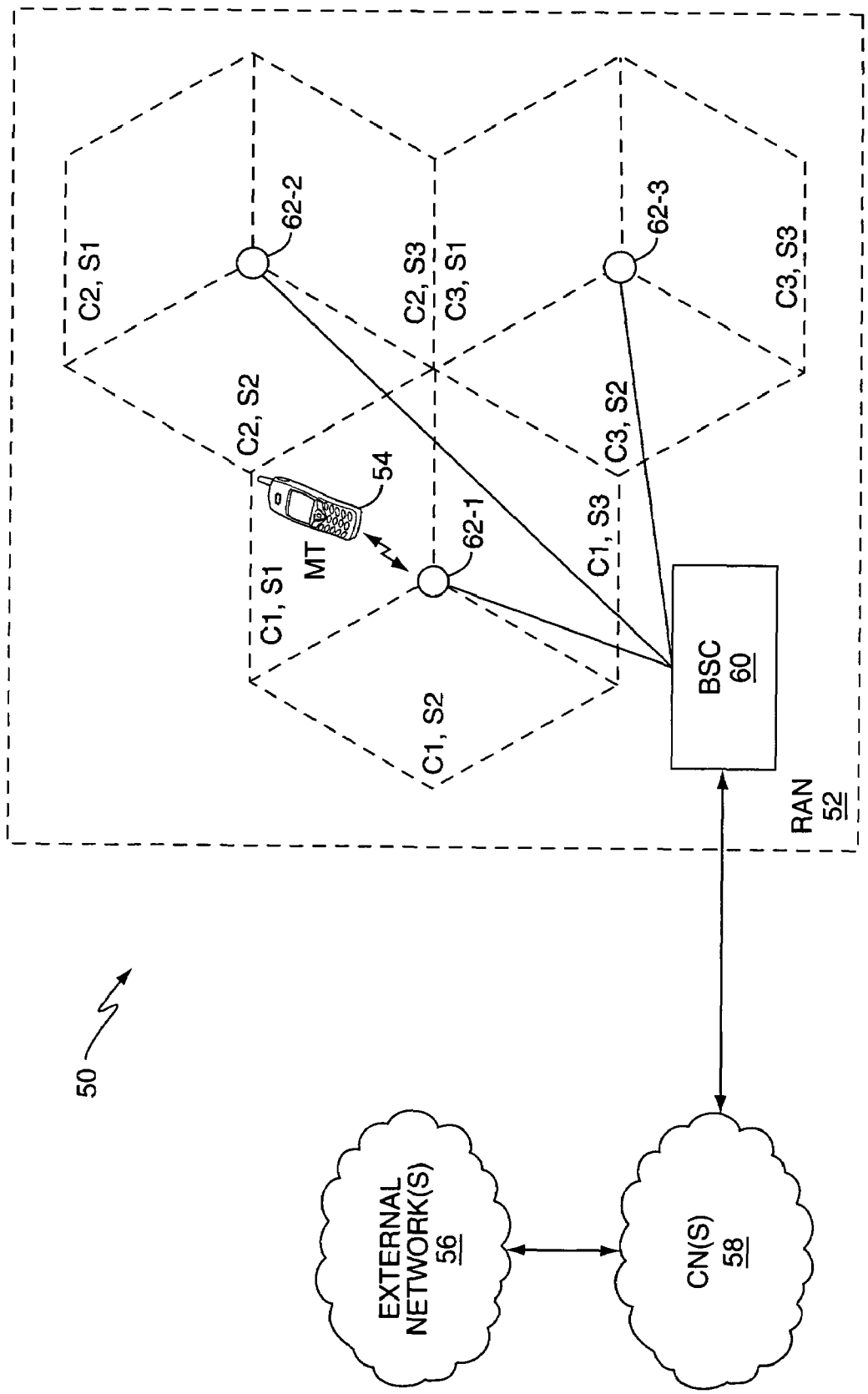
FIG. 5 is a block diagram of a wireless communication network, such as a cellular communication network based on W-CDMA standards, wherein a mobile station and/or a base station incorporate gain scaling as taught herein.

In addition to the variability of receiver architecture, those skilled in the art should appreciate that the gain scaling determination methods taught herein may be embodied in receivers intended for a variety of applications, such as shown in the context of FIG. 5, depicting a wireless communication network 50. By way of non-limiting example, the network 50 may comprise a cellular communication network based on the W-CDMA standards.

The illustrated embodiment of the network 50 includes at least one Radio Access Network (RAN) 52, which communicatively couples a plurality of mobile stations 54—one is shown for clarity—to one or more external networks 56—such as the Internet—through one or more Core Networks (CNs) 58. In more detail, according to the illustrated embodiment, the RAN 52 comprises one or more Base Station Controllers (BSCs) 60, each supporting a number of Base Transceiver Stations (BTSs) 62, which provide sectorized radio coverage, e.g., cell C1 including sectors S1, S2, and so on.

In the context of FIG. 5, an embodiment of the G-RAKE receiver 12 described herein may be implemented, for example, in the mobile stations 54. Such an implementation may be advantageous in W-CDMA embodiments of the network 50, at least for mobile stations for which HS-DSCH reception is desired. Of course, this implementation example should be understood as non-limiting.

Indeed, the gain scaling parameter determination methods taught herein permit G-RAKE receivers to determine requisite traffic-to-pilot gain scaling as part of the LS fitting process used to determine the impairment correlations for combing weight generation. As such, in W-CDMA and other embodiments, the scaling aspect of QAM and other amplitude-dependent demodulation becomes part of the parametric/explicit G-RAKE weight computation process, and avoids additional gain determination processing steps. Therefore, the present invention is not limited by the foregoing discussion, or by the accompanying drawings. Rather, the present invention is limited only by the following claims and their legal equivalents.

What is claimed is:

1. A method of determining a traffic-to-pilot gain scaling parameter in a Generalized RAKE (G-RAKE) receiver comprising:

obtaining despread traffic and pilot values from a received CDMA signal;

generating channel estimates from the despread pilot values;

measuring data correlations for the despread traffic values;

expressing the data correlations as a function of interference and noise correlations scaled by first and second model fitting parameters, respectively, and the channel estimates scaled by a gain scaling parameter; and determining the gain scaling parameter in conjunction with the first and second model fitting parameters via least squares fitting of the function to the data correlations.

2. The method of claim 1, wherein measuring data correlations for the despread traffic values comprises measuring data correlations across despread traffic values received in a given window of time.

3. The method of claim 2, wherein the received CDMA signal comprises a Wideband CDMA (W-CDMA) signal, and wherein the given window of time comprises one or more transmission slots within a given Transport Time Interval (TTI).

4. The method of claim 1, further comprising computing maximum-likelihood combining weights for the G-RAKE receiver as a function of the interference correlations and the channel estimates.

5. The method of claim 4, further comprising computing a signal-to-noise ratio for the despread traffic values as a function of the maximum-likelihood combining weights and the channel estimates.

6. The method of claim 4, further comprising computing estimated traffic symbols from the despread traffic values and the maximum-likelihood combining weights.

7. The method of claim 6, further comprising computing a normalization factor as a function of the gain scaling parameter for use in demodulating the estimated traffic symbols.

8. The method of claim 1, wherein expressing the data correlations as a function of interference and noise correlations scaled by first and second model fitting parameters, respectively, and the channel estimates scaled by a gain scaling parameter comprises expressing the function as a sum of three terms, the first term comprising a product of the first model fitting parameter and an interference correlation matrix corresponding to modeled interference, the second term comprising a product of the second model fitting parameter and a noise correlation matrix corresponding to modeled noise, and the third term comprising a product of the gain scaling parameter and a channel response matrix formed from the channel estimates.

9. A computer readable medium storing a computer program for determining a traffic-to-pilot gain scaling parameter in a Generalized RAKE (G-RAKE) receiver, the computer program comprising:

program instructions to obtain despread traffic and pilot values from a received CDMA signal;

program instructions to generate channel estimates from the despread pilot values;

program instructions to measure data correlations for the despread traffic values;

program instructions to express the data correlations as a function of interference and noise correlations scaled by first and second model fitting parameters, respectively, and the channel estimates scaled by a gain scaling parameter; and program instructions to determine the gain scaling parameter in conjunction with the first and second model fitting parameters via least squares fitting of the function to the data correlations.

10. The computer readable medium storing a computer program of claim 9, wherein the program instructions to measure data correlations for the despread traffic values comprises program instructions to measure data correlations across despread traffic values received in a given window of time.

11. The computer readable medium storing a computer program of claim 10, wherein the received CDMA signal comprises a Wideband CDMA (W-CDMA) signal, and wherein the given window of time comprises one or more transmission slots within a given Transport Time Interval (TTI).

12. The computer readable medium storing a computer program of claim 9, wherein the computer program further comprises program instructions to compute maximum-likelihood combining weights for the G-RAKE receiver as a function of the interference correlations and the channel estimates.

13. The computer readable medium storing a computer program of claim 12, wherein the computer program further comprises program instructions to compute a signal-to-noise ratio for the despread traffic values as a function of the maximum-likelihood combining weights and the channel estimates.

14. The computer readable medium storing a computer program of claim 12, wherein the computer program comprises program instructions to compute estimated traffic symbols from the despread traffic values and the maximum-likelihood combining weights.

15. The computer readable medium storing a computer program of claim 14, wherein the computer program comprises program instructions to compute a normalization factor as a function of the gain scaling parameter for use in demodulating the estimated traffic symbols.

16. The computer readable medium storing a computer program of claim 9, wherein the program instructions to express the data correlations as a function of interference and noise correlations scaled by first and second model fitting parameters, respectively, and the channel estimates scaled by a gain scaling parameter comprise program instructions to express the function as a sum of three terms, the first term comprising a product of the first model fitting parameter and an interference correlation matrix corresponding to modeled interference, the second term comprising a product of the second model fitting parameter and a noise correlation matrix corresponding to modeled noise, and the third term comprising a product of the gain scaling parameter and a channel response matrix formed from the channel estimates.

17. A Generalized RAKE (G-RAKE) receiver circuit comprising one or more processing circuits configured to determine a traffic-to-pilot gain scaling parameter, said one or more processing circuits configured to:

express data correlations of despread traffic values obtained from a received CDMA signal as a function of interference and noise correlations scaled by first and second model fitting parameters, respectively, and channel estimates scaled by a gain scaling parameter; and determine the gain scaling parameter in conjunction with the first and second model fitting parameters via least squares fitting of the function to the data correlations.

18. The G-RAKE receiver circuit of claim 17, wherein the one or more processing circuits comprise a correlation measurement circuit configured to measure the data correlations across despread traffic values received in a given window of time.

19. The G-RAKE receiver circuit of claim 18, wherein the received CDMA signal comprises a Wideband CDMA (W-CDMA) signal, and wherein the given window of time comprises one or more transmission slots within a given Transport Time Interval (TTI).

20. The G-RAKE receiver circuit of claim 17, wherein the one or more processing circuits comprise a combining weight calculation circuit configured to compute maximum-likelihood combining weights for the G-RAKE receiver as a function of the interference correlations and the channel estimates.

21. The G-RAKE receiver circuit of claim 20, wherein the one or more processing circuits comprise a signal-to-noise ratio estimation circuit configured to compute a signal-to-noise ratio for the despread traffic values as a function of the maximum-likelihood combining weights and the channel estimates.

22. The G-RAKE receiver circuit of claim 20, wherein the one or more processing circuits comprise a symbol estimation circuit configured to estimate traffic symbols from the despread traffic values and the maximum-likelihood combining weights.

23. The G-RAKE receiver circuit of claim 22, wherein the one or more processing circuits comprise a normalization factor calculation circuit configured to calculate a normalization factor as a function of the gain scaling parameter for use in demodulating the estimated traffic symbols.

24. The G-RAKE receiver circuit of claim 17, wherein the one or more processing circuits comprise a model calculation circuit configured to express the data correlations as a sum of three terms, the first term comprising a product of the first model fitting parameter and an interference correlation matrix corresponding to modeled interference, the second term comprising a product of the second model fitting parameter and a noise correlation matrix corresponding to modeled noise, and the third term comprising a product of the gain scaling parameter and a channel response matrix formed from the channel estimates.

* * * * *

UNITED STATES PATENT AND TRADEMARK OFFICE
CERTIFICATE OF CORRECTION

PATENT NO. : 7,590,167 B2  Page 1 of 1
APPLICATION NO. : 11/215584
DATED : September 15, 2009
INVENTOR(S) : Fulghum et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 987 days.

Signed and Sealed this

Twenty-first Day of September, 2010

David J. Kappos
*Director of the United States Patent and Trademark Office*